United States Patent [19]

Beirute

[11] 4,190,110
[45] Feb. 26, 1980

[54] METHOD OF CEMENTING WELLBORES USING HIGH TEMPERATURE CEMENT MUD SPACER

[75] Inventor: Robert M. Beirute, Fort Worth, Tex.

[73] Assignee: The Western Company of North America, Ft. Worth, Tex.

[21] Appl. No.: 907,568

[22] Filed: May 19, 1978

[51] Int. Cl.² .............................................. E21B 33/16
[52] U.S. Cl. ................................. 166/291; 252/8.55 R
[58] Field of Search ...................... 166/291, 292, 285; 175/65; 252/8.55 R, 8.5 P

[56] References Cited

U.S. PATENT DOCUMENTS

| | | | |
|---|---|---|---|
| 2,044,758 | 6/1936 | Cross et al. | 175/65 X |
| 2,206,677 | 7/1940 | Shepler | 166/292 |
| 2,582,909 | 1/1952 | Laurence | 166/291 |
| 3,046,221 | 7/1962 | Dodd | 252/8.5 |
| 3,208,523 | 9/1965 | Coyle et al. | 166/292 |
| 3,658,701 | 4/1972 | McGlothlin et al. | 252/8.5 P |
| 3,854,538 | 12/1974 | Suman, Jr. et al. | 166/292 X |
| 3,878,895 | 4/1975 | Wieland et al. | 166/291 X |
| 3,884,302 | 5/1975 | Messenger | 166/291 |
| 3,887,009 | 6/1975 | Miller et al. | 166/292 |
| 4,141,843 | 2/1979 | Watson | 166/291 |

OTHER PUBLICATIONS

Beirute, Robert M., "All Purpose Cement Mud Spacer", Society of Petroleum Engineers (SPE 5691), Jan. 29-30, 1976, 8 pages.

Primary Examiner—Stephen J. Novosad
Attorney, Agent, or Firm—Richards, Harris & Medlock

[57] ABSTRACT

A spacer composition for use in borehole cementing operations is disclosed which has excellent high temperature stability and compatability with cement slurries and drilling fluids. The spacer composition comprises a single phase water base system containing stabilized attapulgite clay.

6 Claims, 2 Drawing Figures

METHOD OF CEMENTING WELLBORES USING
HIGH TEMPERATURE CEMENT MUD SPACER

BACKGROUND OF THE INVENTION

In one aspect the present invention relates to a novel spacer composition useful in downhole wellbore cementing operations. In another aspect, this invention relates to novel spacer compositions tailor weighted for use in downhole cementing applications. Still a further aspect of this invention relates to a method for cementing boreholes which includes the use of a spacer composition having excellent stability at temperatures at least as high as 500° F., for example.

Conventional drilling procedures often include the placement of pipes or casings into the borehole to facilitate further drilling operations. The annulus between the outside wall of the casing and the inside wall of the borehole is filled with a mixture composed primarily of cement and water to thereby fix the casing rigidly in the borehole. Most conventional drilling operations also employ a drilling fluid, also known as drilling mud, used to carry the tailings out of the borehole and facilitate drilling. These drilling fluids will normally be present in substantial amounts of the wellbore as the casings are placed therein. Thus, a conventional method for placing cementing compositions is to pump them down the interior of the casing so that upon reaching the bottom of the casing they pass upwardly into the annulus between the casing and the borehole, displacing the mud and filling this annulus with cement. The cement, after hardening in the annulus, serves to fix the casing rigidly in the borehole.

The problem of obtaining a good cementing job is one of displacing substantially all of the drilling fluid in the annulus with the cement composition. Unfortunately, many of the drilling fluids employed are not compatible with oil well cements so that when the cementing composition comes into contact with the drilling fluids the mixture of cement and drilling fluid may flocculate or gel to form a material of complex chemical composition which is extremely viscous such that it becomes substantially unpumpable with conventional pumps and thereby prevents pumping of all the cement out of the interior of the casing and into the annulus. This can result in plugging of the interior of the well casing or, at the very least, channeling of the cement in the annulus so that the cement does not form a continuous phase completely around the annulus. Also, this gel can plug the annulus causing a buildup of pressure by the cement composition behind it to a degree sufficient to fracture the formation and pump cement into the formation. This can even plug the oil and gas producing formation of the well. With cement channels comes incomplete, and therefore weakened, cementing jobs which can allow fluids to leak away from the borehole being drilled and be lost in the incompletely cemented annulus and/or any porous formation adjacent thereto. Also, unwanted water may enter the casing from the formation in the same manner. The ultimate consequence is substantial economic and drilling efficiency loss.

In order to alleviate the problems which occur when well cement is allowed to contact or otherwise admix with drilling muds, of either the water base or oil base variety, spacer compositions have been used. Basically, the function of the spacer composition is to insulate, and act as a barrier between, the drilling mud present in the borehole and the cement composition. Thus, spacers are pumped into the borehole prior to introduction of the cement composition but after the drilling muds being employed. The requirements for spacer compositions include compatibility with both drilling muds and well cement compositions. Further, it is important that the spacer compositions possess sufficient stability such that the physical characteristics thereof do not change drastically at elevated temperatures which are sometimes present in boreholes. An example of a spacer composition is set forth in U.S. Pat. No. 3,799,874 to Parker. That composition is disclosed to be especially useful with oil base drilling fluids and comprises a water-in-oil emulsion in combination with an additive effective to prevent gelation of the spacer upon contact with a cementing composition.

Because both oil based drilling fluids and water based drilling fluids are employed in the field, a spacer composition which is compatible with either type of drilling fluid would be especially desirable. Further, a spacer composition which retains its stability at relative high borehole temperatures, of at least about 500° F. would be especially desirable.

SUMMARY OF THE INVENTION

I have discovered that a single phase water based spacer composition which is stable even at elevated temperatures and is useful with both water base and oil base muds can be prepared from attapulgite clay. Stabilization of the attapulgite clay in aqueous suspension is effected through the addition of water soluble zinc salts such as zinc oxide, for example, and the adjustment of the pH of the composition to a value of about 7 or above, and preferably between from about 8 to about 10. In addition to the pH adjusted, zinc salt containing, attapulgite clay water suspension, well cement retarders, water wetting surfactants, cement defoamers, and weighting agents can be employed to tailor the spacer composition for use with specific oil muds, cement compositions, and borehole conditions.

The spacer compositions of the subject invention make possible a method for implacing the cement composition in the wellbore, containing either oil base or water base drilling fluids, by interposing a sufficient amount of the spacer composition to insure that the well cement and drilling fluids will not come in contact with one another. The spacer compositions of the present invention, when employed in such a method, have the advantages that they are compatible with oil base mud, water base mud, and well cements. Further, these compositions are stable at temperatures of at least about 500° F. BHCT (bottom hole circulating temperature). The compositions are capable of being weighted in a range of from about 8 to about 22 pounds per gallon, thus making them useful with a wide range of drilling muds. The compositions have good fluid loss control and, when the spacer compositions comprise a surfactant, provide a water wetting effect which insures maximum bonding of the well cement in the annulus between the casing and borehole wall.

DETAILED DESCRIPTION OF THE INVENTION

Figure 1:
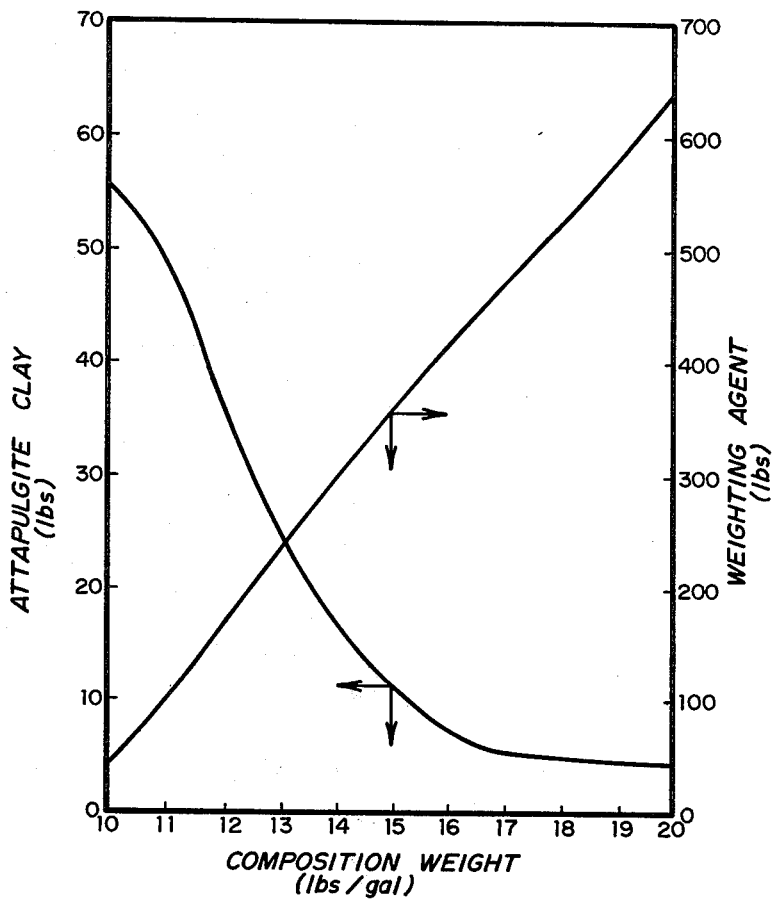
FIG. 1 is a graph of the preferred amount of attapulgite clay and barite (weighting agent) present in the spacer compositions of the present invention as a function of desired spacer composition weight (lbs/gal.)

The method of the present invention can be used for implacing conventional well cementing compositions which are well known to those skilled in the art. These compositions are primarily mixtures of cement and water, with or without the addition of accelerators or retarders to speed up, or hinder, respectively, the hardening time of the cements. The method of the present invention comprises first inserting in the wellbore and into contact with the water base or oil base drilling mud present therein, the spacer composition of this invention, followed by introduction of the cement composition. The cement composition is pumped into the wellbore under a pressure sufficient to displace the drilling fluid and the spacer material upward in the annulus between the casing and wellbore until substantially all of the cement composition is passed from the interior of the casing into the annulus where it is held until it hardens. The spacer is maintained between the drilling fluid and the cement composition during this process of implacement and while the cement composition is allowed to harden. Although the normal procedure in cementing casings is to pump the cement composition down the interior of the casing and upwards into the annulus, it is possible, and this invention also covers, the implacement of a cement composition in an annulus by injecting the cement composition into the annulus at the earths surface, thereby displacing drilling fluid in the wellbore of the interior of the casing as the cement composition passes downwardly in the annulus.

The well drilling spacer compositions of the present invention comprise an aqueous mixture of attapulgite clay stabilized with a small amount of a water soluble zinc salt and adjusted to a pH of at least about 7 and preferably from about 8 to about 10. In addition, conventional types of cement retarding or accelerator agents, surfactants, and defoaming agents, can be added, as needed, to obtain the desired characteristics depending upon the borehole conditions, the cement employed, and the drilling fluid being used. Because the spacer composition is water based and contains no oils it is especially suited for offshore drilling operations where oil containing spacers cannot be employed.

The amount of attagpulgite clay, also known as fullers earth, employed in the spacer compositions of this invention will vary over wide ranges depending upon the desired spacer weight. For any application, the weight of the spacer composition should be somewhere between the weight of the drilling fluid and the weight of the cement slurry. Thus, usually it is recommended that a spacer composition be at least about 0.5 pounds per gallon heavier than the weight of the drilling mud. This weight difference will help insure total displacement of the drilling fluid. The spacer compositions of the present invention can be formulated so as to have weights generally in the range of from about 8 to about 22 pounds per gallon. For the purpose of attaining the desired spacer composition weight, various weighting agents known in the art can be employed. One preferred weighting agent is barite which, due to its fine grind, and specific gravity of 4.3, finds wide acceptance as a weighting agent in conventional types of drilling fluids.

The spacer compositions of the present invention can be prepared following the procedure outlined hereinbelow. The proper amounts of water, weighting agents, attapulgite clay, zinc salt, retardants, or accelerators are determined based on the desired weight of the spacer composition and the specific drilling conditions. The dry solids can be blended together in the desired amounts and added slowly to water while stirring strongly. Preferably the solids are added using small increments at one time so as to allow complete dispersion thereof. Agitation is then imparted to the mixture, for example for about five minutes. Sodium hydroxide or some other alkaline pH adjusting agent, is then added, if needed, to bring the pH of the mixture to at least about 7 and preferably within a range of from about 8 to about 10. Agitation is then continued, preferably for about fifteen minutes. After agitation has been slowed, surfactant agents (if desired) are added very slowly so as to avoid foaming, and agitation is continued for about five more minutes. If excess foaming is noted, a liquid defoaming agent may be employed. The spacer composition is then ready for placement.

As noted above the amounts of attapulgite clay and water soluble zinc salts present in the spacer compositions of the present invention will vary depending upon the desired weight of the spacer composition. Generally however it can be stated that attapulgite clay is added in quantities of up to about 56 pounds per barrel of spacer when the desired weight of the spacer composition is 10 pounds per gallon, and can be present in as little as about $4\frac{1}{2}$ pounds per barrel when the weight of the composition is desired to be about 20 pounds per gallon. A study of FIG. 1 will indicate to one skilled in the art the preferred amounts of attapulgite clay per barrel of spacer composition, as a function of the desired final weight (pounds per gallon) of the spacer composition. Of course, the amounts of attapulgite clay indicated in FIG. 1 are intended to demonstrate preferred embodiments only and the present invention is not intended to be limited thereby.

The zinc containing stabilizing compound is preferably zinc oxide but can be suitable water soluble zinc salts such as zinc chloride and zinc carbonate which are effective to stabilize the attapulgite clay-aqueous suspension at the pH composition indicated above.

Figure 2:
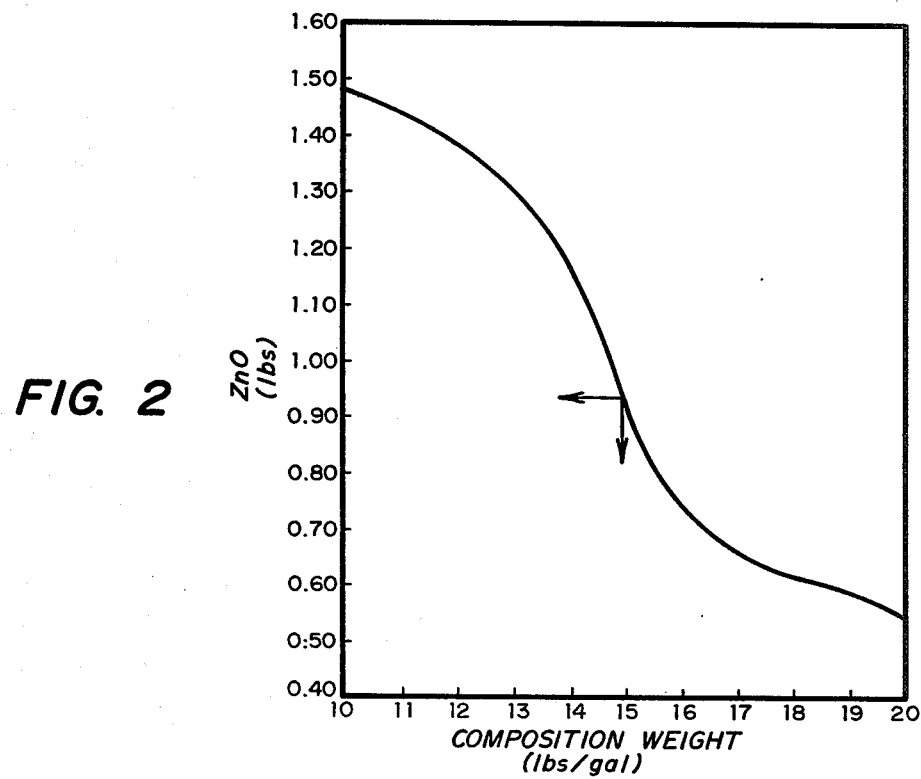
FIG. 2 is a graph of the preferred amount of zinc oxide present in the spacer composition of the present invention as a function of spacer composition weight (lbs/gal.).

The amount of zinc oxide necessary to stabilize the attapulgite clay-aqueous suspension of the spacer composition varies as a function of the desired weight of the spacer composition. Thus, a study of FIG. 2 demonstrates that within a spacer composition weight range of 10 to 20 pounds per gallon zinc oxide in the amount of from about 1.5 pounds to about 0.54 pounds per barrel of spacer composition will provide desirable results. Again, FIG. 2 is not intended to be limiting but only demonstrates preferred embodiments.

The accelerators added to the spacer composition are preferably of the inorganic salt type and can include calcium chloride ammonium chloride, and potassium chloride for example. The amount of these accelerators employed in the spacer composition (if any) will be dependent upon well conditions and the type of cement and drilling fluid being employed.

Similarly retarding agents such as carboxymethyl hydroxyethyl cellulose retardants and lignosulfonate retardants can be employed in varying quantities depending upon the mud, cement system and the conditions present in a particular borehole. Other suitable retarding agents include hydroxyethyl cellulose, salts of boric acid, and several organic and inorganic salts and acids such as zinc chloride and gluconic acid.

Finally other additives such as surfactants, which assure that the surfaces contacted by the spacer compositions are left water-wet can be added in order to insure better cement bonding thereto. These surfactants can be employed in amounts which are also a function of the desired weight of the spacer composition. If defoaming agents are necessary, usually about 1 pint per barrel of spacer composition will serve to sufficiently defoam the composition.

Spacer compositions prepared in the above manner have been found to have excellent stability at temperatures of up to at least about 500° F. Generally, the heavier the weight (lb/gal) of the spacer composition the greater its stabilization at high temperatures. Thus, the ability to withstand high temperatures, as well as the advantages that the spacer compositions can be employed with either oil base or water base drilling muds and are compatible with conventional well cements, make the compositions especially useful to those in the wellbore drilling art.

EXAMPLES

The following examples are set forth for the purpose of further describing the invention to one of ordinary skill in the art and should not be interpreted in a limiting fashion.

EXAMPLE 1

In order to measure the temperature stability of the spacer compositions of the present invention, various specifically weighted spacer compositions were raised to a simulated bottom hole circulating temperature (BHCT) and pressure using a particular casing-cementing well-simulation schedule published in the American Petroleum Institute Publication RP-10B (modified schedule S 11g, 1977. Once the BHCT was reached, the stirring process of the consistometer was ceased and the spacer was allowed to remain at that temperature and pressure for 30 minutes. At 10 minute intervals the stirring action was briefly resumed to observe any developing settlement problems. Following this 30 minute period the spacer was cooled to room temperature and observations were made as to settlement. The results of this experiment are set forth in Table I. The compositions of the spacers identified in Table I by lbs/gal are set forth in Table II.

TABLE I.
Cement Spacer Consistency Data at High Temperatures

| Spacer Weight (lbs/gal) | API Schedule | Minutes at BHCT and Pressure | Bearden units of Consistency (Bc)* | Comments |
|---|---|---|---|---|
| 13.0 | API S modified 11g, gradient 1.3** BHCT 325° | 0 10 20 30 | 18 27 29 29 | Spacer after 30 min at 325° F. was smooth with no solids drop, after developing a gel-like consistency it was easily broken back into its original form by simple agitation. |
| 15.0 | API modified .11g, | 0 | 25 | After 30 min |

TABLE I.-continued
Cement Spacer Consistency Data at High Temperatures

| Spacer Weight (lbs/gal) | API Schedule | Minutes at BHCT and Pressure | Bearden units of Consistency (Bc)* | Comments |
|---|---|---|---|---|
|  | gradient 1.5 BHCT 375° | 10 20 30 | 25 25 25 | at 375° F. some solid settlement was observed. |
| 17.0 | API modified .11g, gradient 1.9 BHCT 450° F. | 0 10 20 30 | 40 39 37 37 | After 30 min at 450° F. no solids lost, spacer in good shape. |
| 19.0 | API modified .11g, gradient 1.9 BHCT 450° F. | 0 10 20 30 | 37 37 37 37 | After 30 min at 450° F. no solids lost, spacer in good shape. |

*(Dimensionless, empirical units of consistency (API RP-10B)
**(°F./100 ft. depth)

TABLE II.

| Ingredient | Spacer Composition | | | |
|---|---|---|---|---|
|  | 13 lb/gal | 15 lb/gal | 17 lb/gal | 19 lb/gal |
| Water | 400 ml | 400 ml | 400 ml | 400 ml |
| Barite | 350g | 590g | 855g | 1,170g |
| Surfactant blend | 20 ml | 20 ml | 20 ml | 20 ml |
| Zinc oxide | 1.98g | 1.56g | 1.20g | 1.20g |
| Lignosulfonate retarder | 3.5g | 5.6g | 8.4g | 11.7g |
| Attapulgite clay | 39g | 19g | 10g | 10g |
| Carboxymethyl, hydroxyethyl cellulose | 7.0g | 9.2g | 9.2g | 6.2g |

EXAMPLE 2

In order to study the compatibility of the spacer compositions with cement slurrys and drilling muds, thickening time tests were run on combinations of these three fluids. These thickening tests were run in accordance with API bulletin RP-10B. The results are set forth in Table III.

TABLE III.
High Temperature Compatibility Tests-
Test Temperature: 350° F.

| System | Results |
|---|---|
| Cement Slurry: | |
| Class H*, 1.8% high temperature retarder mixture, 35% silica sand, 42% water. | Typical thickening time of 4 to 6 hours at 350° F. |
| Same slurry as above + 25% spacer composition** by volume. | Thickening time test pulled at 5 hours. No viscosity kicks observed that might indicate incompatibility between the fluids. |
| Same slurry + 1% spacer composition by volume. | Same as above. |
| Same slurry + 5% of a typical oil base mud + 1% spacer composition. | System showed no viscosity kicks indicating compatibility. |
| Typical oil base mud + 5% spacer composition. | No viscosity kicks. |
| Typical water base mud + 5% spacer composition. | No viscosity kicks. |
| Spacer composition + 5% typical oil base mud. | No viscosity kicks. |
| Spacer composition + 5% typical | No viscosity kicks. |

TABLE III.-continued

High Temperature Compatibility Tests-
Test Temperature: 350° F.

| System | Results |
|---|---|
| water base mud. | |

*As per API bulletin spec. 10A.
**The spacer composition was prepared in accordance with FIGS. 1 and 2.

As can be seen from a study of TABLE III, thickening times for mixtures of the cement slurry and the spacer composition were not decreased, thereby indicating that any admixture of the cement composition with the spacer would not cause premature setting of the cement with resultant wellbore blockage. Furthermore, mixtures of cement slurries, oil base muds, and spacer compositions did not indicate any incompatibility from the standpoint of sudden increases in viscosity. Lastly, mixtures of the oil base mud and spacer composition, and water base mud and spacer composition indicated that these mixtures are compatible since no rapid increase in viscosity was observed to occur.

This invention has been described with relation to the preferred embodiments thereof however various adaptations and modifications will now be apparent to one skilled in the art and it is intended to cover all such modifications as fall within the scope of the appended claims.

I claim:

1. A method for cementing wellbores which contain a drilling fluid comprising introducing an amount of a spacer composition into said wellbore prior to introduction of the cement composition, said spacer composition being present in an amount effective to prevent contact of said cement with said drilling fluid and said spacer composition comprising an aqueous suspension of attapulgite clay stabilized with an effective amount of zinc oxide and having a pH of at least about 7.

2. The method of claim 1 wherein said spacer composition has a pH of from about 8 to about 10.

3. The method of claim 1 wherein said spacer composition is introduced into said wellbore by pumping it down the center of the casing to thereby pass from the bottom outlet thereof and displace said drilling fluid in the annulus between the casing and the wellbore.

4. The method of claim 1 wherein said spacer composition is introduced into said wellbore by pumping it down the annulus between the casing and the wellbore, thereby displacing the drilling fluid up into said casing.

5. The method of claim 1 wherein said spacer composition comprises a weighting agent so as to have a weight of from about 8 to about 22 lbs/gal.

6. The method of claim 1 wherein said spacer composition further comprises additives selected from the group consisting of cement retardants, cement accelerators, surfactants, and mixtures thereof to thereby achieve desired properties for specified wellbore cementing conditions.

* * * * *